US011128377B2

(12) United States Patent
Gao (10) Patent No.: US 11,128,377 B2
(45) Date of Patent: Sep. 21, 2021

(54) METHOD AND DEVICE OF TRANSMITTING AND RECEIVING DATA (71) Applicant: NOKIA SHANGHAI BELL CO., LTD., Shanghai (CN)

(72) Inventor: Zhensen Gao, Shanghai (CN)

(73) Assignee: ALCATEL LUCENT, Nozay (FR)

( * ) Notice: Subject to any disclaimer, the term of this patent is extended or adjusted under 35 U.S.C. 154(b) by 0 days.

(21) Appl. No.: 16/319,418

(22) PCT Filed: Mar. 13, 2017

(86) PCT No.: PCT/CN2017/076493
§ 371 (c)(1),
(2) Date: Jan. 21, 2019

(87) PCT Pub. No.: WO2018/014565
PCT Pub. Date: Jan. 25, 2018

(65) Prior Publication Data
US 2019/0280775 A1 Sep. 12, 2019

(30) Foreign Application Priority Data
Jul. 20, 2016 (CN) .......................... 201610574893.X (51) Int. Cl.
H04J 14/02 (2006.01)
H04B 10/27 (2013.01)
(52) U.S. Cl.
CPC .............. *H04B 10/27* (2013.01); *H04J 14/02* (2013.01)
(58) Field of Classification Search
CPC .... H04J 14/02; H04J 14/0227; H04J 14/0254; H04J 14/0261
See application file for complete search history.

(56) References Cited

U.S. PATENT DOCUMENTS 6,501,877 B1 * 12/2002 Weverka ............ G02B 6/29307
385/31
9,166,704 B1 10/2015 Nagarajan
(Continued)

FOREIGN PATENT DOCUMENTS

CN 105450325 A 3/2016
CN 105721098 A 6/2016
(Continued)

OTHER PUBLICATIONS

Zheng Li, "28 Gb/s Duobinary Signal Transmission over 40km Based on 10 GHz DML and PIN for 100 Gb/s PON," 2015 Optical Society of America, vol. 23, No. 16, Aug. 10, 2015, the main body, chapters 2-4, and figures 2-3.
(Continued)

Primary Examiner — Nathan M Cors
(74) Attorney, Agent, or Firm — Harness, Dickey & Pierce, P.L.C.

(57) ABSTRACT

The method of transmitting data includes encoding, at an optical line terminal, data to be transmitted over a plurality of wavelength channels; providing the encoded data to corresponding lasers as modulation inputs, to enable the lasers to generate optical signals representing the data; multiplexing the optical signals; and equalizing the multiplexed optical signals for transmission via an optical transmission link. The method of receiving data includes de-multiplexing, at an optical network unit, optical signals received from an optical transmission link; selecting, from the de-multiplexed optical signals, an optical signal corresponding to a particular wavelength channel; converting the selected optical signal into electric signals; and decoding the electric signal to determine the data.

16 Claims, 8 Drawing Sheets

(56) References Cited

U.S. PATENT DOCUMENTS

| | | | | |
|---|---|---|---|---|
| 2003/0072060 A1* | 4/2003 | Sourani | ................ | H04B 10/614 |
| | | | | 398/121 |
| 2003/0215239 A1* | 11/2003 | Joo | .................... | H04B 10/2971 |
| | | | | 398/83 |
| 2006/0104638 A1* | 5/2006 | Chung | ................ | H04J 14/0226 |
| | | | | 398/71 |
| 2007/0206898 A1* | 9/2007 | Wang | ................. | G02B 6/29358 |
| | | | | 385/24 |
| 2009/0003842 A1* | 1/2009 | Mahgerefteh | ...... | H04B 10/5162 |
| | | | | 398/187 |
| 2009/0092396 A1* | 4/2009 | Lyubomirsky | ..... | H04B 10/5167 |
| | | | | 398/89 |
| 2009/0136240 A1* | 5/2009 | Malouin | .............. | H04B 10/548 |
| | | | | 398/183 |
| 2017/0353242 A1* | 12/2017 | Mansouri Rad | ......... | H04B 3/32 |

FOREIGN PATENT DOCUMENTS

| | | |
|---|---|---|
| CN | 105743600 A | 7/2016 |
| CN | 105743601 A | 7/2016 |
| WO | WO-2016044822 A1 | 3/2016 |

OTHER PUBLICATIONS

International Search Report PCT/ISA/210 for PCT International Application No. PCT/CN2017/076493 dated May 31, 2017.
Chinese Office Action dated Mar. 5, 2019, issued in corresponding Chinese Application No. 201610574893.
Extended European Search Report dated Mar. 3, 2020 for EP Application No. 17830209.7.
Lilin Yi, et al., "Symmetric 100G EPON proposals based on 10G-class optical components", IEEE-SA, Piscataway, NJ, vol. 802.3, Mar. 11, 2016, pp. 1-21, XP088102644.

\* cited by examiner

(a) Original Data Waveform (b) Waveform after 20km Single-mode Optic Fiber (c) Restored Waveform after Equalization

Fig. 13

(a) Unequalized  (b) Equalized and low-pass filtered at 12.5GHz  (c) Equalized and low-pass filtered at 6.75GHz

Fig. 14

METHOD AND DEVICE OF TRANSMITTING AND RECEIVING DATA

CROSS-REFERENCE TO RELATED APPLICATIONS

This application is a national phase under 35 U.S.C. § 371 of PCT International Application No. PCT/CN2017/076493 which has an international filing date of Mar. 13, 2017, which claims priority to Chinese Application No. 201610574893.X, filed Jul. 20, 2016, the entire contents of each of which are hereby incorporated by reference.

FIELD

Embodiments of the present disclosure generally relate to the field of optical communications, and more specifically, methods and devices implemented at an optical line terminal (OLT) and an optical network unit (ONU) for transmitting and receiving data.

BACKGROUND

The next-generation passive optical network (NG-PON2), which has already been standardized, adopts time division and wavelength division-based passive optical network (TWDW-PON) technologies, wherein four wavelengths are utilized to support the transmission rate of 40 Gb/s, each wavelength supporting a transmission rate of 10 Gb/s. The requirements for broadband bandwidth are increasing continuously due to advance of access bandwidth applications, such as high-definition video and cloud computing etc. In such case, it is required to boost the data rate above 10 Gb/s per wavelength in the future access network.

Recently, the next-generation Ethernet passive optical network (NG-EPON), which is intended for providing a cost-effective solution when bandwidth requirements of terminal users cannot be met, in Institute of Electrical and Electronic Engineers (IEEE) 802.3 standard has attracted a lot of attention. At present, the work group for the standard mainly discusses 4 wavelength channels respectively having a transmission rate of 25 Gb/s, as an option for NG-EPON, to implement the NG-EPON with a transmission rate of 100 Gb/s.

SUMMARY

In general, embodiments of the present disclosure provide methods and devices implemented at an OLT and an ONU for transmitting and receiving data.

According to one aspect, embodiments of the present disclosure provide a method implemented at an OLT for transmitting data. The method comprises: encoding, at an optical line terminal, data to be transmitted over a plurality of wavelength channels; providing the encoded data to corresponding lasers as modulation inputs, to enable the lasers to generate optical signals representing the data; multiplexing the optical signals; and equalizing the multiplexed optical signals for transmission via an optical transmission link.

In this aspect, embodiments of the present disclosure also provide a device implemented at an OLT for transmitting data. The device comprises: an encoder configured for encoding data to be transmitted over a plurality of wavelength channels; a signal generator configured for providing the encoded data to corresponding lasers as modulation inputs, to enable the lasers to generate optical signals representing the data; a multiplexer configured for multiplexing the optical signals; and an equalizer configured for equalizing the multiplexed optical signals for transmission via an optical transmission link.

According to another aspect, embodiments of the present disclosure provide a method implemented at an OLT for receiving data. The method comprises: equalizing, at the OLT, optical signals received from an optical transmission link; de-multiplexing the equalized optical signals; converting the de-multiplexed optical signals into electric signals; and decoding the electric signals to determine the data.

In this aspect, embodiments of the present disclosure further provide a device implemented at an OLT for receiving data. The device comprises: an equalizer configured for equalizing, at an optical line terminal, optical signals received from an optical transmission link; a de-multiplexer configured for de-multiplexing the equalized optical signals; a photoelectric converter configured for converting the de-multiplexed optical signals into electric signals; and a decoder configured for decoding the electric signals to determine the data.

According to a further aspect, embodiments of the present disclosure provide a method implemented at an ONU for transmitting data. The method comprises: encoding data to be transmitted; providing the encoded data to a laser as a modulation input to enable the laser to generate an optical signal representing the data; and multiplexing the optical signal for transmission via an optical transmission link.

In this aspect, embodiments of the present disclosure also provide a device implemented at an ONU for transmitting data. The device comprises: an encoder configured for encoding data to be transmitted; a signal generator configured for providing the encoded data to a laser as a modulation input to enable the laser to generate an optical signal representing the data; and a multiplexer configured for multiplexing the optical signal for transmission via an optical transmission link.

According to another aspect, embodiments of the present disclosure provide a method implemented at an ONU for receiving data. The method comprises: de-multiplexing optical signals received from an optical transmission link; selecting, from de-multiplexed optical signals, an optical signal corresponding to a particular wavelength channel; converting the selected optical signal into an electric signal; and decoding the electric signal to determine the data.

In this aspect, embodiments of the present disclosure also provide a device implemented at an ONU for receiving data. The device comprises: a de-multiplexer configured for de-multiplexing optical signals received from an optical transmission link; a selector configured for selecting, from de-multiplexed optical signals, an optical signal corresponding to a particular wavelength channel; a photoelectric converter configured for converting the selected optical signal into an electric signal; and a decoder configured for decoding the electric signal to determine the data.

With the solutions in accordance with the embodiments of the present disclosure, numerous advantageous technical effects can be achieved. For example, the NG-EPON system supporting a transmission rate of 100 Gb/s and above can be realized with the low cost and complexity of the system.

It should be appreciated that the contents described in this Summary are not intended to identify key or estransmittedial features of the embodiments of the present disclosure, or limit the scope of the present disclosure. Other features of the present disclosure will be understood more easily through the following description.

BRIEF DESCRIPTION OF THE DRAWINGS

Through the following detailed description with reference to the accompanying drawings, the above and other features, advantages and aspects of every embodiment of the present disclosure will become more apparent. In the drawings, same or similar reference signs represent same or similar elements, wherein:

FIGS. 10($a$), 10($b$) and 10($c$) illustrate schematic diagrams of an exemplary implementation of a NG-EPON system in accordance with embodiments of the present disclosure;

FIGS. 11($a$) and 11($b$) illustrate spectral distributions of downlink and uplink wavelengths, a MZI and a cyclic AWG response in accordance with embodiments of the present disclosure;

FIGS. 12($a$) and 12($b$) illustrate schematic diagrams of spectrums of a wavelength channel before and after equalization in accordance with embodiments of the present disclosure;

FIGS. 13($a$), 13($b$) and 13($c$) illustrate schematic diagrams regarding a waveform of a data signal of a particular wavelength channel in accordance with embodiments of the present disclosure; and FIGS. 14($a$), 14($b$) and 14($c$) illustrate schematic diagrams of a corresponding eye pattern of data signals of a particular wavelength channel in accordance with embodiments of the present disclosure.

DETAILED DESCRIPTION OF EMBODIMENTS

Embodiments of the present disclosure will be described in more details with reference to the drawings. Although the drawings illustrate some embodiments of the present disclosure, it should be appreciated that the present disclosure can be implemented in various manners and should not be interpreted as being limited to the embodiments explained herein. On the contrary, the embodiments are provided to understand the present disclosure in a more thorough and complete way. It should be appreciated that drawings and embodiments of the present disclosure are provided only for the purpose of examples rather than restricting the protection scope of the present disclosure.

The term "includes" and its variants are to be read as open-ended terms that mean "includes, but is not limited to." The term "based on" is to be read as "based at least in part on." The term "one embodiment" is to be read as "at least one embodiment." The term "a further embodiment" is to be read as "at least a further embodiment." Definitions related to other terms will be described in the following description.

Figure 1:
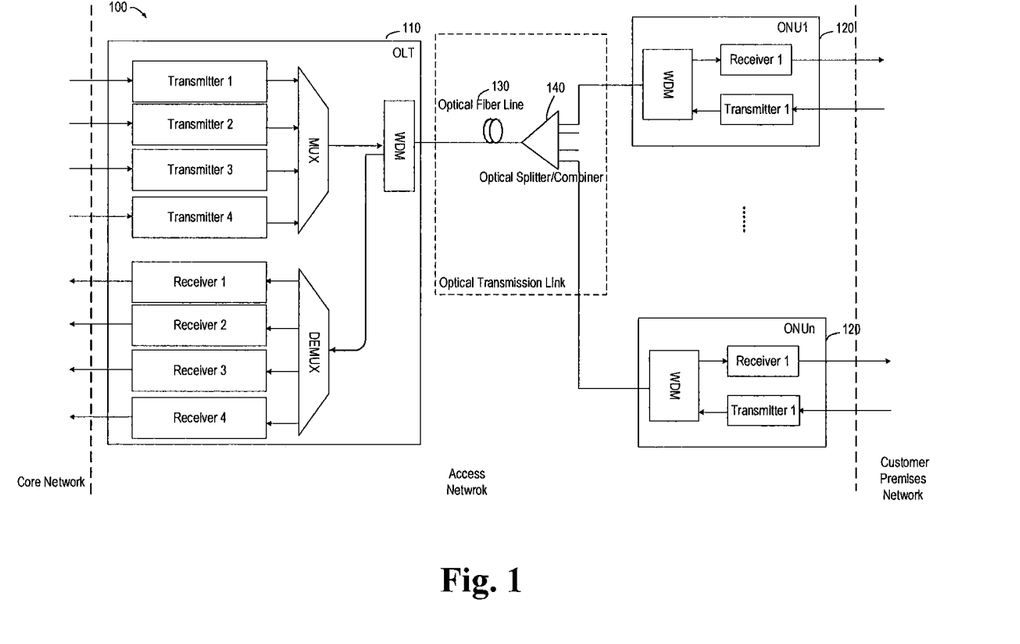
FIG. 1 illustrates a schematic diagram of a network system where embodiments of the present disclosure can be implemented.

Basic architecture of the NG-EPON is firstly described below with reference to FIG. 1, which illustrates a schematic diagram of a network system 100 in which embodiments of the present disclosure can be implemented. As shown in FIG. 1, the system 100 (access network) can include an OLT 110, an ONU1-ONUn (n being a positive integer) 120, an optical fiber line 130 and an optical splitter/combiner 140. In the downlink direction, the OLT 110 can receive data to be transmitted from a core network, modulate the data to be transmitted onto optical signals via a plurality of wavelength channels (4 wavelength channels are illustrated in the drawings, as an example), multiplex the corresponding modulated optical signals at a multiplexer (MUX) and then perform wavelength division multiplexing on downlink and uplink optical signals at a wavelength division multiplexer/de-multiplexer (WDM) to facilitate transmission to the ONU side via an optical transmission link. As shown, the optical transmission link can include an optical fiber line 130 and an optical splitter/combiner 140. The wavelength division multiplexed/de-multiplexed optical signals are transmitted from the OLT side to the ONU side via the optical fiber line 130 and distributed via the optical splitter/combiner 140 to the respective ONU1-ONUn 120, which separately select optical signals of a particular wavelength to acquire data therefrom and transmit the acquired data to user terminals in a customer premise network. In the uplink direction, the ONU1-ONUn 120 respectively can receive the data to be transmitted from the customer premise network, modulate the data to be transmitted onto optical signals of a particular wavelength and perform the wavelength division multiplexing/de-multiplexing on the uplink and downlink signals to facilitate transmission to the OLT side via the optical transmission link. Specifically, the optical signals undergoing the wavelength division multiplexing/de-multiplexing can be combined with optical signals of other ONUs via the optical splitter/combiner 140 to facilitate transmission to the OLT side via the optical fiber line 130. The OLT 110 subsequently acquires data from the received optical signals and transmits the data to the core network for processing.

Under the architecture of the above system 100, the work group of the IEEE 802.3 standard, as mentioned above, mainly discusses 4 wavelength channels respectively having a transmission rate of 25 Gb/s to implement the NG-EPON with a transmission rate of 100 Gb/s. However, it is a quite challenging task to develop a cost-effective optical transceiver with commercial optical components at the transmission rate of 25 Gb/s, especially for the uplink direction at the ONU side. In a traditional gigabyte passive optical network (GPON)/Ethernet passive optical network (EPON), the ONU transmitter is untunable and is restricted to the bit rate of 2.5 GB/s, so it is impossible to directly apply the GPON/EPON transmitter into the NG-EPON. Although the ONU transmitter is tunable in a TWDM-PON system, its maximum bit rate is still limited to 10 Gb/s, which is also not suitable for the NG-EPON. Intuitively, an external modulation method of high-speed Mach-Zehnder Modulator (MZM) or Electro-Absorption Modulated Laser (EML) can be employed for the NG-EPON, but these technologies, when operated at the data rate of 25 Gb/s, is sensitive to polarization or quite expensive. Accordingly, such application is not cost-effective for the access network. In addition, when the uplink and the downlink transmission rates in the access network are boosted to 25 Gb/s, the resultant costs of corresponding receivers and electronic processing components also increase significantly compared with the low bit rate case.

For another aspect, it is also proposed in some existing solutions that advanced optical modulation formats, such as a duobinary system, a four-level pulse amplitude modulation (PAM-4) and the like, are applied into the NG-EPON since these advanced optical modulation formats can ease the bandwidth requirements of electronic and optical components of the NG-EPON. However, these existing solutions also generate signals with bit rate of 25 Gb/s per wavelength channel based on the high-speed external modulation at 10 Gb/s or above. Correspondingly, complex digital signal processing (DSP) and equalization algorithm (FFE, LMS or MLSE etc.) must be introduced to compensate signal degradation resulted from insufficient bandwidth of electronic or optical components, such as photoelectric detectors, external modulators and electric amplifiers etc. Because the ONU is extremely sensitive to costs in the uplink direction, the use of expensive high-speed external modulation method and complex DSP will result into high ONU costs, which restricts the large-scale deployment of the NG-EPON in the future. Although the OLT costs can be shared by all ONUs in the downlink direction, the use of 4 parallel expensive high-speed transmitters with the rate of 25 Gb/s at the OLT side may still increase system costs and complexity.

In view of the above problems in the prior art, the basic concept of the present invention lies in that a direct modulated laser (DML), in replacement of an externally modulated laser, is applied into data uplink or downlink transmission. In the case of the DML, it is only required to provide electrically modulated signals to the laser as a modulation input without additional components like optical modulators, which can significantly lower system costs and complexity. Based on such concept, embodiments of the present disclosure correspondingly provide methods respectively implemented at an OLT and an ONU for transmitting and receiving data. Several example implementations are described in details below with reference to FIGS. 2-5.

Figure 2:
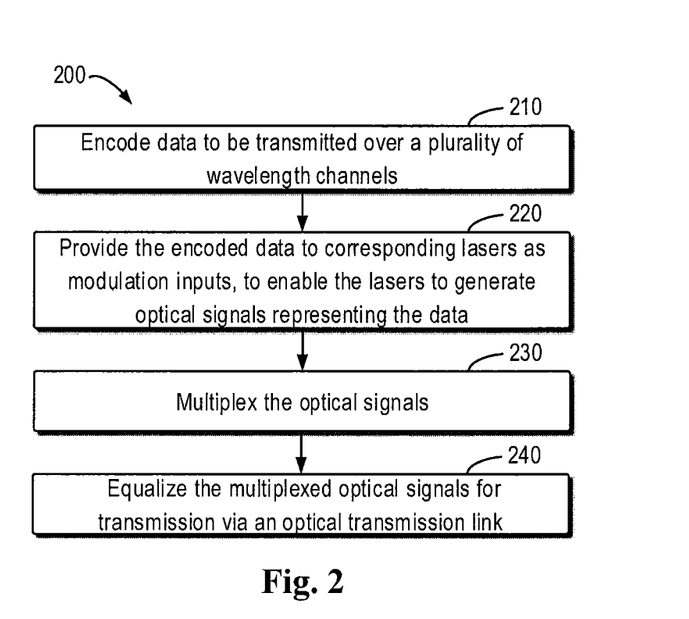
FIG. 2 illustrates a flowchart of a method implemented at an OLT for transmitting data in accordance with embodiments of the present disclosure.

FIG. 2 illustrates a flowchart of a method 200 implemented at an OLT for transmitting data in accordance with embodiments of the present disclosure. The method 200 can be implemented at the OLT 110 shown in FIG. 1. As shown in FIG. 2, data to be transmitted over a plurality of wavelength channels are encoded at block 210. This step can be performed by any transmitter in transmitters 1-4 at the OLT 110 shown in FIG. 1. For example, in the embodiments of the present disclosure, 4 wavelength channels are employed to transmit the data to be transmitted, wherein each wavelength channel realizes a transmission rate of 25 Gb/s. However, embodiments of the present disclosure are not restricted to this and can be applied to any other suitable amount of wavelength channels and any other appropriate transmission rates.

Here, the data to be transmitted can be non-return-to-zero (NRZ) data. In accordance with embodiments of the present disclosure, the data to be transmitted can be encoded through any suitable encoding manners to make the data suitable for transmission. In one embodiment, a duobinary encoding can be performed on the data to be transmitted. For example, the data to be transmitted can be electrically filtered, such as low-pass filtered, to convert the data to be transmitted into a duobinary format, thereby the receiver bandwidth of the ONU can be greatly saved. It is certain that embodiments of the present disclosure are not restricted to this and also can adopt any suitable encoding approaches already known or to be developed in the art. For example, four-level pulse amplitude modulation (PAM-4) can be utilized to encode the data to be transmitted in other embodiments.

At block 220, the encoded data are provided to the corresponding lasers as modulation inputs, to enable the lasers to generate optical signals representing the data. This step also can be performed by any transmitter in transmitters 1-4 at the OLT 110 shown in FIG. 1.

In accordance with embodiments of the present disclosure, the laser can be any suitable laser already known or to be developed in the art. In one embodiment, the laser can be a broadband laser, for example, a high-speed laser with a 3 dB bandwidth of a 25 GHz. In alternative embodiments, the laser can be a narrowband laser, for example, a low-speed laser with a 3 dB bandwidth of 2.5 GHz or 10 GHz. In the case of such narrowband laser, the lower costs of the system can be achieved. It should be understood that embodiments of the present disclosure are not limited to this and can employ lasers with any suitable 3 dB bandwidth already known or to be developed in the art.

In other embodiments, a laser with a fixed wavelength can be used. In this case, it is required that the wavelength of each laser is precisely manufactured at the OLT side to independently generate a downlink wavelength aligned with a passband of the multiplexing component. In an alternative embodiment, a laser with a tunable wavelength can be employed, for example, a wavelength tunable laser with a heater, which can have a small wavelength tuning range of 3 nm. Under such circumstance, a cyclic arrayed waveguide grating (AWG) is subsequently introduced for multiplexing to greatly relax the desired wavelength manufacturing precision and accordingly lower the costs.

In accordance with embodiments of the present disclosure, a bias current of the laser can be selected to be 3 to 5 times a threshold current of the laser and a modulated current of the laser is selected to be slightly higher than the threshold current of the laser. It is certain that the choice of the bias current and the modulated current is not restricted to the above embodiments and those skilled in the art can adopt any other suitable manners according to the requirements. Therefore, when the encoded data is provided to a corresponding laser as a modulation input, the laser can directly generate optical signals representing the data by adjusting the bias current and the modulated current of the laser without requiring an additional optical modulator module like that in the external modulation method. Hence, the system complexity and the corresponding system cost can be reduced.

The generated optical signals are multiplexed at block 230. In accordance with embodiments of the present disclosure, this step can include multiplexing of the optical signals among a plurality of wavelength channels and wavelength division multiplexing of the optical signals among uplink and downlink, as illustrated by the multiplexer (MUX) and the wavelength division multiplexer/de-multiplexer (WDM) at the OLT 110 of FIG. 1. In one embodiment, the above-mentioned cyclic AWG multiplexing can be performed on the optical signals and the wavelength division multiplexing is then performed on the cyclic AWG multiplexed optical signals. In accordance with embodiments of the present disclosure, when transmission power fails to meet the requirement, the cyclic AWG multiplexed optical signals can be amplified and then the wavelength division multiplexing is performed on the amplified optical signals. The above multiplexing is well-known for those skilled in the art and will not be repeated here to avoid confusing the present invention.

At block 240, the multiplexed optical signals are equalized to facilitate transmission via the optical transmission link. As stated above, optical signals are generated in a direct modulation manner. However, the optical signals generated by the direct modulation may have unsatisfactory transmission performance, which results into distortion of the optical signals after the transmission over a single-mode fiber. According to embodiments of the present disclosure, in order to facilitate restoring the optical signals after direct modulation laser and single-mode fiber transmission, the multiplexed optical signals can be equalized prior to the downlink transmission (e.g., prior to the optical fiber line 130 shown in FIG. 1) to facilitate transmission over the optical transmission link.

It should be appreciated that any suitable optical equalizer already known or to be developed in the art can be employed. For example, in one embodiment, an optical equalizer based on simple MZI can be utilized. In this way, optical equalization and signal restoration can be performed, in a centralized manner, on a plurality of downlink and uplink high-speed wavelength channels at a central office. The cost of the optical equalizer is shared by all ONUs, so the cost of each ONU can be maintained at an extremely low level and the signal transmission at a high bit rate up to 25 Gb/s can be supported without the help of a high-speed and expensive external modulation. In addition, any additional optical dispersion compensation module or electronic dispersion compensation (EDC) is not further required. Moreover, it is unnecessary to arrange complex electric equalization and DSP processing module at the receiving side (ONU side), which greatly simplifies the structure at the receiving side and lowers the costs.

In accordance with one embodiment of the present disclosure, a spectral response of a MZI can be designed such that its free spectral range is half an interval between wavelength channels. For example, the free spectral range can be selected as 50 GHz for the 100 GHz channel interval of uplink and downlink signals, which can more effectively perform equalization and optical signal restoration. In this case, the wavelength of the downlink and the uplink signals is no longer accurately aligned with a peak frequency of each passband of an interferometer and instead has frequency red shifts relative to these wavelength channels. In one embodiment, the frequency red shift can be selected as one third of the spectral range of the interferometer, so as to effectively perform multi-channel duplexing optical equalization.

Subsequently, the equalized optical signals can be transmitted via the optical transmission link. For example, the optical signals are transmitted from the OLT side to the ONU side via the the optical transmission link including the optical fiber line 130 and the optical splitter/combiner 140 shown in FIG. 1.

Figure 3:
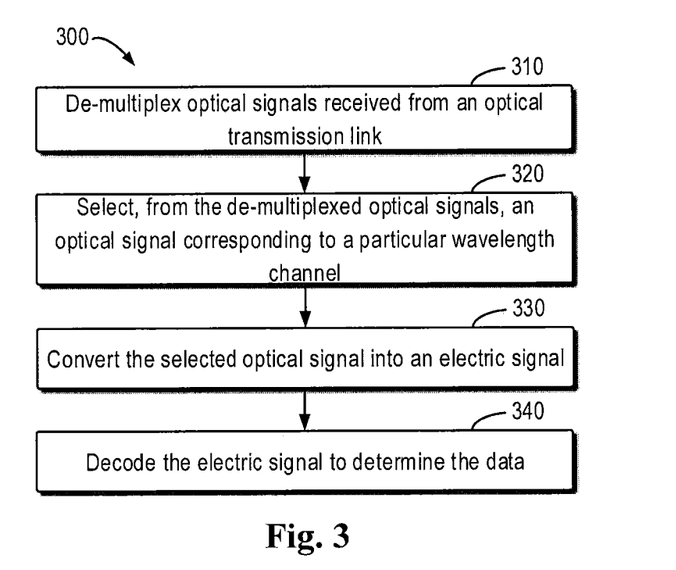
FIG. 3 illustrates a flowchart of a method implemented at an ONU for receiving data in accordance with embodiments of the present disclosure.

The method implemented at the OLT side for transmitting data has been described in accordance with embodiments of the present disclosure. Correspondingly, embodiments of the present disclosure also provide a method implemented at the ONU side for receiving data, which will be explained in details below with reference to FIG. 3. FIG. 3 illustrates a method 300 implemented at the ONU side for receiving data in accordance with embodiments of the present disclosure. The method 300 can be implemented at any ONU of ONU1-ONUn 120 shown in FIG. 1, e.g., at any receiver in receivers 1-n.

As shown in FIG. 3, the optical signals received from the optical transmission link are de-multiplexed at block 310 and this step can be implemented at the wavelength division multiplexer/de-multiplexer (WDM) in the ONU1-ONUn 120 of FIG. 1. For example, the ONU1-ONUn 120 can receive, via the optical splitter 140 over the optical transmission link, the multiplexed and equalized optical signals transmitted from the OLT 110 and de-multiplex these optical signals.

At block 320, an optical signal corresponding to a particular wavelength channel is selected from the de-multiplexed optical signals. In accordance with embodiments of the present disclosure, this step can be implemented via a tunable filter, which is employed to select a wavelength channel expected to be detected. In the case that the DML with a fixed wavelength is used at the OLT side, it is required to perform a small amount of wavelength tuning on the tunable filter to cover 4 downlink wavelengths. However, in the case that the DML with a tunable wavelength is used at the OLT side, it is required to increase the wavelength tuning range of the tunable filter to effectively cover 4 downlink wavelengths. It should be appreciated that embodiments of the present disclosure have no limitations in this regard.

At block 330, the selected optical signal is converted into an electric signal. This step can be implemented via a photoelectric detector. The processing of block 330 is well-known in the art and will not be repeated here to avoid confusing the present invention.

At block 340, the electric signal is decoded to determine the data. This step can be a decoding processing corresponding to the encoding processing described above in the block 210 with reference to FIG. 2. In accordance with one embodiment of the present disclosure, the electric signal can be low-pass filtered and the low-pass filtered electric signal is decoded to determine the data. In one embodiment, the cut-off frequency of the low-pass filter can be selected as 0.25-0.3 time the bit rate. In this case, for an optical signal generated by direct modulation, the low-pass filtering for the optical signal can be implemented by introducing at the ONU side an additional low-pass filter or a specially designed photoelectric detector and a trans-impedance amplifier (TIA) response. In this way, the performance of the restored signals can be further improved.

In accordance with embodiments of the present disclosure, the method 300 implemented at the ONU for receiving data does not require electric equalization of electric signals and associated DSP processing in the prior art solution, which greatly simplifies the receiver structure at the ONU side and improves cost effectiveness. Moreover, the performance of signal restoration can be straightforwardly improved by the additional low-pass filtering.

Figure 4:
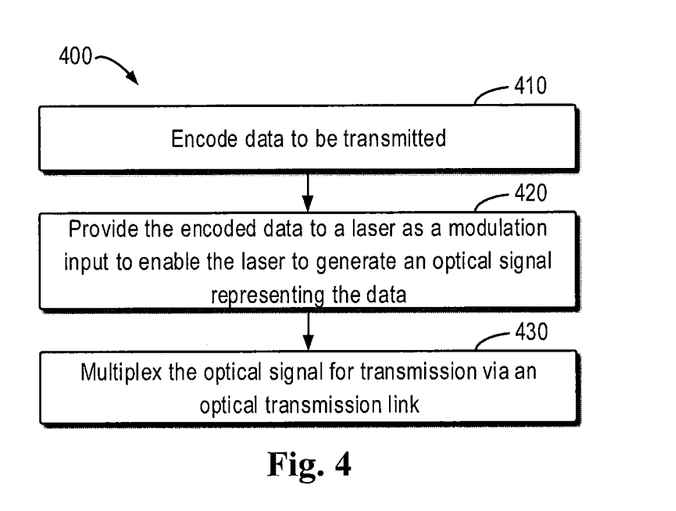
FIG. 4 illustrates a flowchart of a method implemented at an ONU for transmitting data in accordance with embodiments of the present disclosure.

The methods for transmitting and receiving data in the downlink direction in accordance with embodiments of the present disclosure have been described above with reference to FIGS. 2 and 3. Correspondingly, embodiments of the present disclosure also provide a method for transmitting and receiving data in the uplink direction, which will be explained in more details below with reference to FIGS. 4 and 5. FIG. 4 illustrates a method 400 implemented at an ONU for sending data in accordance with embodiments of the present disclosure. This method can be implemented by any transmitter in transmitters 1-n at the ONU1-ONUn 120 of FIG. 1.

As shown in FIG. 4, the data to be transmitted are encoded at block 410. The processing of block 410, which is similar to the above processing of block 210 shown with reference to FIG. 2, will not be repeated here. At block 420, the encoded data are provided to the lasers as modulation inputs to enable the lasers to generate optical signals representing data. The processing of block 420, which is similar to the above processing of block 220 shown with reference to FIG. 2, will not be repeated here. At block 430, the optical signals are multiplexed to facilitate transmission over the optical transmission link. The block 430 can be implemented via the wavelength division multiplexer/de-multiplexer (WDM) in the ONU1-ONUn 120 of FIG. 1 to perform wavelength division multiplexing on the downlink and the uplink optical signals and then combine with the optical signals of other ONUs via the optical splitter/combiner 140 to facilitate transmission to the OLT 110 side over the optical fiber line 130.

In accordance with embodiments of the present disclosure, in the method 400 implemented at the ONU for transmitting data, a laser is modulated directly via an electrically modulated signal, such that the laser can directly generate an optical signal representing the data without requiring an additional optical modulator module like that in the external modulation method. Accordingly, the transmitter structure at the ONU side can be greatly simplified and the costs can be reduced, so as to facilitate the large-scale deployment of the NG-EPON in the future while reducing the costs and complexity of the entire system.

The method implemented at ONU for transmitting data in accordance with embodiments of the present disclosure has been described so far. Correspondingly, embodiments of the present disclosure also provide a method implemented at an OLT for receiving data. More details will be provided below with reference to FIG. 5, which illustrates a method 500 implemented at an OLT for receiving data in accordance with embodiments of the present disclosure. The method 500 can be implemented at the OLT 110 shown in FIG. 1, e.g., at any receiver in receivers 1-4.

Figure 5:
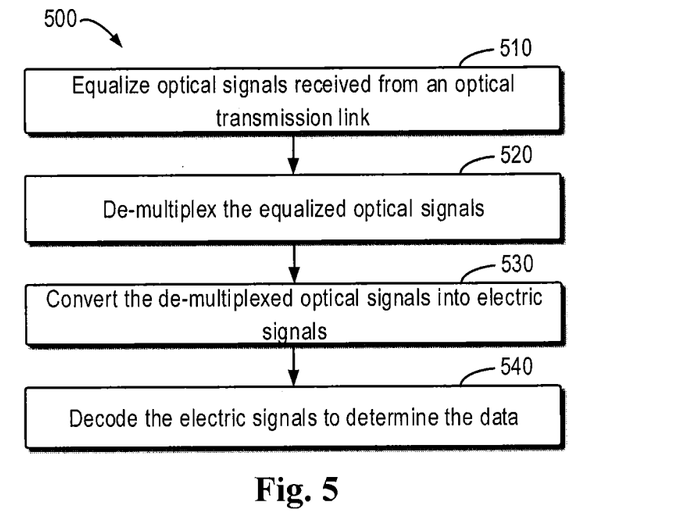
FIG. 5 illustrates a flowchart of a method implemented at an OLT for receiving data in accordance with embodiments of the present disclosure.

As shown in FIG. 5, optical signals received from an optical transmission link are equalized at block 510. In accordance with embodiments of the present disclosure, the optical signals received, by the OLT 110, from the optical transmission link, e.g., the optical fiber line 130 are generated at the ONU side via direct modulation. As mentioned in the description of the block 240 of FIG. 2, the optical signals generated from direct modulation will be distorted after the transmission over the single-mode fiber. In accordance with embodiments of the present disclosure, the optical signals, when received at the uplink, are optically equalized, so as to restore the optical signals resulted from direct modulation laser and single-mode fiber transmission. It should be understood that any suitable optical equalizer already known or to be developed in the art can be adopted. For example, in one embodiment, the optical equalizer based on simple MZI can be employed. In this way, optical equalization and signal restoration can be performed, in a centralized manner, on a plurality of downlink and uplink high-speed wavelength channels at the central office. The processing of block 510, which is similar to the above processing of block 240 shown with reference to FIG. 2, will not be repeated here.

At block 520, the equalized optical signals are de-multiplexed. In accordance with embodiments of the present disclosure, this step can include wavelength division de-multiplexing of the equalized optical signals among uplink and downlink and de-multiplexing of the equalized optical signals among a plurality of wavelength channels and can be implemented at the wavelength division multiplexer/de-multiplexer (WDM) and the de-multiplexer (DEMUX) in the OLT 110 of FIG. 1. The de-multiplexing of block 520 can correspond to the multiplexing of block 230 described above with reference to FIG. 2. For example, in one embodiment, a cyclic AWG de-multiplexing can be performed on the optical signals. In accordance with embodiments of the present disclosure, in the case that the transmission power fails to meet the requirement, the wavelength division de-multiplexed optical signals can be pre-amplified and then the cyclic AWG de-multiplexing is performed on the wavelength division de-multiplexed optical signals. The de-multiplexing is well-known for those skilled in the art and will not be repeated here to avoid confusing the present invention.

At block 530, the de-multiplexed optical signals are converted into electric signals for respective wavelength channels. This step can be implemented by a photoelectric detector and the processing of this step is well-known for those skilled in the art and will not be repeated here to avoid confusing the present invention.

At block 540, the electric signals are decoded to determine the data. This step can be decoding processing corresponding to the encoding processing described above in the block 310 with reference to FIG. 3. In accordance with one embodiment of the present disclosure, low-pass filtering can be performed on the electric signals and decoding can be performed on the low-pass filtered electric signals to determine the data. In one embodiment, the cut-off frequency of the low-pass filter can be selected as 0.25-0.3 time the bit rate. In this case, the optical signals generated by direct modulation can be low-pass filtered by introducing at the ONU side an additional low-pass filter or a specially designed photoelectric detector and a TIA response, which can further improve the performance of the restored signals.

According to embodiments of the present disclosure, in the method 500 implemented at the OLT for receiving data, the optical equalization can be executed, in a centralized manner, on downlink and uplink signals at the OLT side without configuring optical equalization modules separately for the receivers at the OLT side, so as to lower the complexity of the receiver structure. Moreover, an equalization module is also not required at the ONU side, which simplifies the transmitter structure at the ONU side and improves cost effectiveness. In addition, the performance of signal restoration can be straightforwardly improved by the additional low-pass filtering.

Embodiments of the present disclosure also can provide respective devices implemented at an OLT and an ONU corresponding to the above described methods 200-500 for transmitting and receiving data. The details will be provided below with reference to FIGS. 6 to 9.

Figure 6:
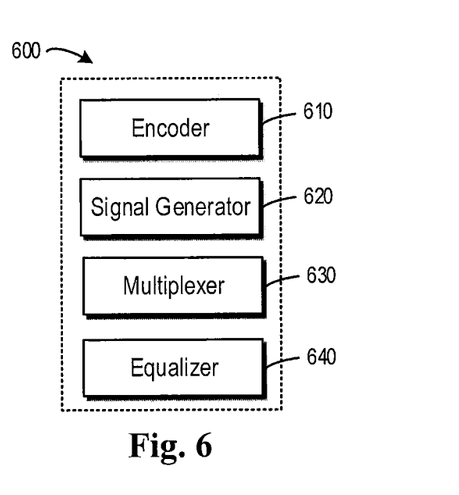
FIG. 6 illustrates a schematic structure diagram of a device implemented at an OLT for transmitting data in accordance with embodiments of the present disclosure.

FIG. 6 illustrates a schematic structure diagram of a device 600 implemented at an OLT for transmitting data in accordance with embodiments of the present disclosure. It should be understood that the device 600 can be implemented, for example, at the OLT 110 shown in FIG. 1. According to FIG. 6, the device 600 can include an encoder 610, a signal generator 620, a multiplexer 630 and an equalizer 640.

The encoder 610 can be configured to encode the data to be transmitted over a plurality of wavelength channels. In one embodiment, the encoder 610 can be configured to perform a duobinary encoding on the data by low-pass filtering of the data.

The signal generator 620 can be configured to provide the encoded data to corresponding lasers as modulation inputs to enable the lasers to generate optical signals representing data. In accordance with embodiments of the present disclosure, the laser can be any suitable laser already known or to be developed in the art. In one embodiment, the lasers can be narrowband lasers. In one embodiment, bias currents of the lasers can be selected to be 3 to 5 times threshold currents of the lasers and modulated currents of the lasers can be selected as slightly higher than the threshold currents of the lasers.

The multiplexer 630 can be configured to multiplex the optical signals. In one embodiment, the multiplexer 630 can include (not shown): a first multiplexer configured to perform cyclic AWG multiplexing on the optical signals; and a second multiplexer configured to perform wavelength division multiplexing on the cyclic AWG multiplexed optical signals. In one embodiment, the device 600 also can include (not shown) an amplifier configured to amplify the cyclic AWG multiplexed optical signals. In this case, the second multiplexer can be configured to perform wavelength division multiplexing on the amplified optical signals.

The equalizer 640 can be configured to equalize the multiplexed optical signals to facilitate transmission of the optical signals via the optical transmission link.

Figure 7:
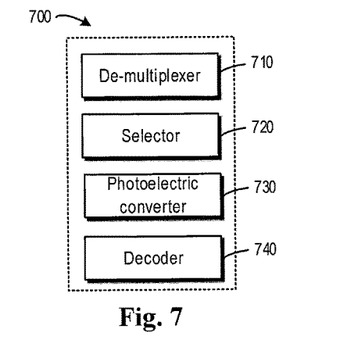
FIG. 7 illustrates a schematic structure diagram of a device implemented at an ONU for receiving data in accordance with embodiments of the present disclosure.

FIG. 7 illustrates a schematic structure diagram of a device 700 implemented at an ONU for receiving data in accordance with embodiments of the present disclosure. It should be understood that the device 700 can be implemented, for example, at any ONU in ONU1-ONUn 120 shown in FIG. 1.

According to FIG. 7, the device 700 can include a de-multiplexer 710, a selector 720, a photoelectric converter 730 and a decoder 740. The de-multiplexer 710 can be configured to de-multiplex optical signals received from the optical transmission link. The selector 720 can be configured to select, from the de-multiplexed optical signals, an optical signal corresponding to a particular wavelength channel. The photoelectric converter 730 can be configured to convert the selected optical signal into an electric signal. The decoder 740 can be configured to decode the electric signal to determine the data.

In one embodiment, the device 700 also can include (not shown) a filter configured to filter the electric signal by low-pass filtering. In this case, the decoder 740 can be configured todecod the low-pass filtered electric signal to determine the data.

Figure 8:
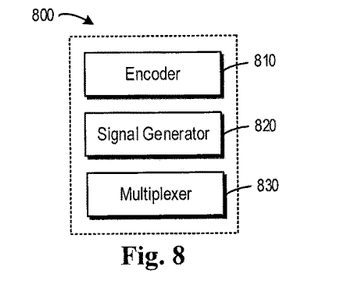
FIG. 8 illustrates a schematic structure diagram of a device implemented at an ONU for transmitting data in accordance with embodiments of the present disclosure.

FIG. 8 illustrates a schematic structure diagram of a device 800 implemented at ONU for transmitting data in accordance with embodiments of the present disclosure. It should be understood that the device 800 can be implemented, for example, at any ONU in ONU1-ONUn 120 shown in FIG. 1.

As shown in FIG. 8, the device 800 can include an encoder 810, a signal generator 820 and a multiplexer 830. The encoder 810 can be configured to encode the data to be transmitted. In one embodiment, the encoder 810 can be configured to perform a duobinary encoding on the data by low-pass filtering of the data. The signal generator 820 can be configured to provide the encoded data to the laser as a modulation input to enable the laser to generate an optical signal representing the data. In accordance with embodiments of the present disclosure, the laser can be any suitable laser already known or to be developed in the art. In one embodiment, the laser can be a narrowband laser. In one embodiment, a bias current of the laser can be selected to be 3 to 5 times a threshold current of the laser and a modulated current of the laser can be as slightly higher than the threshold of the laser. The multiplexer 830 can be configured to multiplex the optical signal to facilitate transmission of the optical signal over the optical transmission link.

Figure 9:
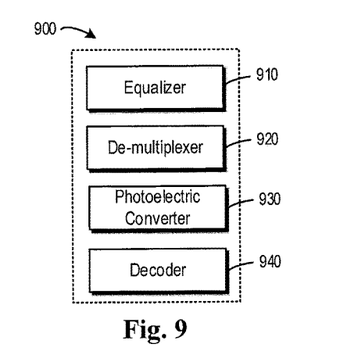
FIG. 9 illustrates a schematic structure diagram of a device implemented at OLT for receiving data in accordance with embodiments of the present disclosure.

FIG. 9 illustrates a schematic structure diagram of a device 900 implemented at an OTL for receiving data in accordance with embodiments of the present disclosure. It should be understood that the device 900 can be implemented, for example, at the OLT 110 shown in FIG. 1.

As shown in FIG. 9, the device 900 can include an equalizer 910, a de-multiplexer 920, a photoelectric converter 930 and a decoder 940. The equalizer 910 can be configured to equalize optical signals received from the optical transmission link. The de-multiplexer 920 can be configured to de-multiplex the equalized optical signals. The photoelectric converter 930 can be configured to convert the de-multiplexed optical signals into electric signals. The decoder 940 can be configured to decode the electric signals to determine the data.

In one embodiment, the device 900 also can include (not shown) a filter configured to filter the electric signals by low-pass filtering. In this case, the decoder 940 can be configured to decode the low-pass filtered electric signals.

It should be understood that each element or unit disclosed in devices 600, 700, 800 and 900 can be respectively configured to implement corresponding steps of the methods 200, 300, 400 and 500 described above with reference to FIGS. 2, 3, 4 and 5. Besides, operations and features of the devices 600-900 and elements or units included therein correspond to the operations and features described above with reference to FIGS. 2 to 5 and have the same effects. The details of the effects will not be repeated here.

Elements or units included in the devices 600, 700, 800 and 900 can be implemented in various ways, including hardware, firmware, software or any combinations thereof. In one embodiment, a part of or all of the elements or units included in the devices 600, 700, 800 and 900 can be at least partially implemented by one or more hardware devices or modules. As an example instead of a restriction, the available exemplary types of hardware logic assemblies include Field Programmable Gate Array (FPGA), Application-Specific Integrated Circuit (ASIC), Application Standard Specific Product (ASSP), System-on-Chip (SOC), Complex Programmable Logical Device (CPLD) and the like. Alternatively, one or more units can be implemented by software and/or firmware, e.g., machine-executable instructions stored on a storage medium.

Moreover, it should be appreciated that some units or modules can include sub-units or sub-modules in the above devices. For example, one amplifier can include multiple amplifiers executing same or different functions etc. These sub-units or sub-modules are not illustrated in the drawings for the sake of clarity.

Methods and devices respectively implemented at an OLT and an ONU for transmitting and receiving data in accordance with embodiments of the present disclosure have been described above with reference to FIGS. 2 to 9. A specific scenario is depicted below with reference to FIG. 10 for the sake of explanation. It should be understood that the scenario is provided as an example for explanation only, rather than restricting the present disclosure.

Figure 10:
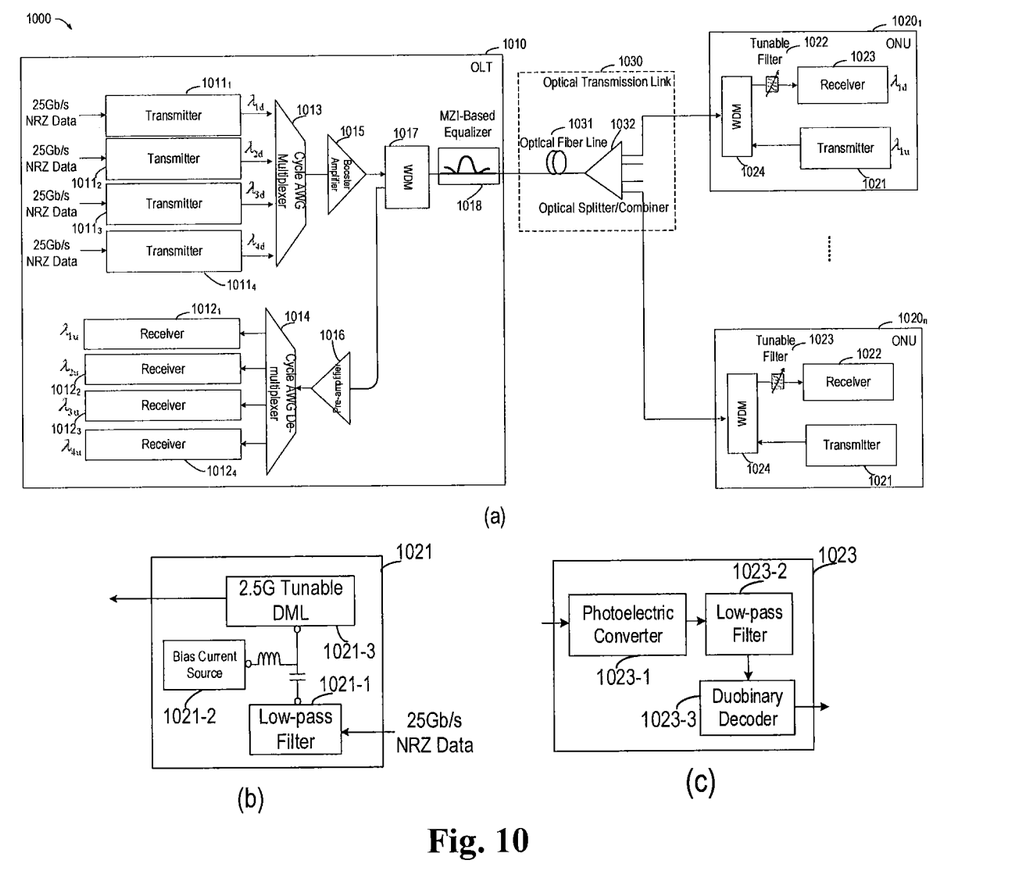

FIG. 10 illustrates a schematic diagram of an exemplary implementation of a NG-EPON system 1000 in accordance with embodiments of the present disclosure. In the system 1000, the data to be transmitted are transmitted via four wavelength channels in uplink and downlink directions, wherein each wavelength channel transmits the 25 Gb/s NRZ data, so as to realize 100 Gb/s aggregated symmetric capacity. FIG. 10 (a) illustrates the entire system architecture of the NG-EPON system 1000 in accordance with embodiments of the present disclosure; FIG. 10 (b) demonstrates an exemplary implementation of the transmitter in the architecture; and FIG. 10 (c) depicts an exemplary implementation of the receiver in the architecture.

As shown in FIG. 10 (a), the system 1000 includes an OLT 1010, n ONUs $1020_1$-$1020_n$ (n being a positive integer) and an optical transmission link 1030. The OLT 1010 contains 4 transmitters $1011_1$-$1011_4$, 4 receivers $1012_1$-$1012_4$, a cyclic AWG multiplexer 1013, a cyclic AWG de-multiplexer 1014, a booster amplifier 1015, a pre-amplifier 1016, a wavelength division multiplexer/de-multiplexer 1017 and an MZI-based equalizer 108. Each of the ONUs $1020_1$-$1020_n$ consists of a transmitter 1021, a tunable filter 1022, a receiver 1023 and a wavelength division multiplexer/de-multiplexer 1024. The optical transmission link 1030 includes an optic fiber line 1031 and an optical splitter/combiner 1032.

Since the transmitters $1011_1$-$1011_4$ and 1021 in FIG. 10 (a) can have the same structure, FIG. 10 (b) only shows the structure of the transmitter 1021, which serves as the example for explanation. According to FIG. 10 (b), the transmitter 1021 can include a low-pass filter 1021-1, a bias current source 1021-2 and a 2.5G tunable DML 1021-3. Similarly, since the receivers $1012_1$-$1012_4$ and 1023 in FIG. 10 (a) can have the same structure, FIG. 10 (c) only shows the structure of the receiver 1023, which serves as the example for explanation. According to FIG. 10 (c), the receiver 1023 can consist of a photoelectric converter 1023-1, a low-pass filter 1023-2 and a duobinary decoder 1023-3.

In the downlink direction of the above system 1000, the respective transmitters $1011_1$-$1011_4$ at the OLT 1010 perform a duobinary encoding on the data to be transmitted and input the encoded data into the 2.5 G tunable DML to generate optical signals representing data, as shown by $\lambda_{1d}$-$\lambda_{4d}$. The cyclic AWG multiplexer 1013 performs the cyclic AWG multiplexing on the optical signals of the respective wavelength channels and the booster amplifier 1015 further amplifies the signals. Subsequently, the uplink and the downlink signals are wavelength division multiplexed by the wavelength division multiplexer/de-multiplexer 1017 and equalized via the MZI-based equalizer 1018 to facilitate transmission over the optical transmission link 1030. At the respective ONU in the ONUs $1020_1$-$1020_n$, the wavelength division multiplexer/de-multiplexer 1024 de-multiplexes the received optical signals, selects via the tunable filter 1022 an optical signal for the wavelength channel Aid and subsequently inputs it into the receiver 1023. In the receiver 1023, the optical signal is converted, via the photoelectric converter 1023-1, into an electric signal, low-pass filtering is performed by the low-pass filter 1023-2 on the electric signal and then a diobinary decoding is performed by the duobinary decoder 1023-3 on the electric signal to determine corresponding data.

In the uplink direction of the above system 1000, at the ONU in the ONUs $1020_1$-$1020_n$, for example the ONU 10201, the transmitter 1021 performs a duobinary encoding on the data to be transmitted and inputs the encoded data into the 2.5 G tunable DML to generate the optical signal representing the data, as shown by $\lambda_{1u}$. The uplink and downlink signals are wavelength division multiplexed by the wavelength division multiplexer/de-multiplexer 1024 to facilitate transmission over the optical transmission link 1030. At the OLT 1010, the received optical signals are equalized by the MZI-based equalizer 108; the equalized optical signals are de-multiplexed by the wavelength division multiplexer/de-multiplexer 1017, amplified by the pre-amplifier 1016, de-multiplexed via the cyclic AWG de-multiplexer 1014 and then input into the respective receivers $1012_1$-$1012_4$, so as to decode the corresponding data in a manner similar to the above receiver 1023.

The inventors quantitatively verify the performance of the embodiments of the present disclosure and sufficiently prove the advantageous technical effects. The details will be provided below with reference to FIGS. 11-14. In particular, the following experimental data are acquired for the system 1000. However, other embodiments of the present disclosure also can fulfill the advantageous effects.

Figure 11:
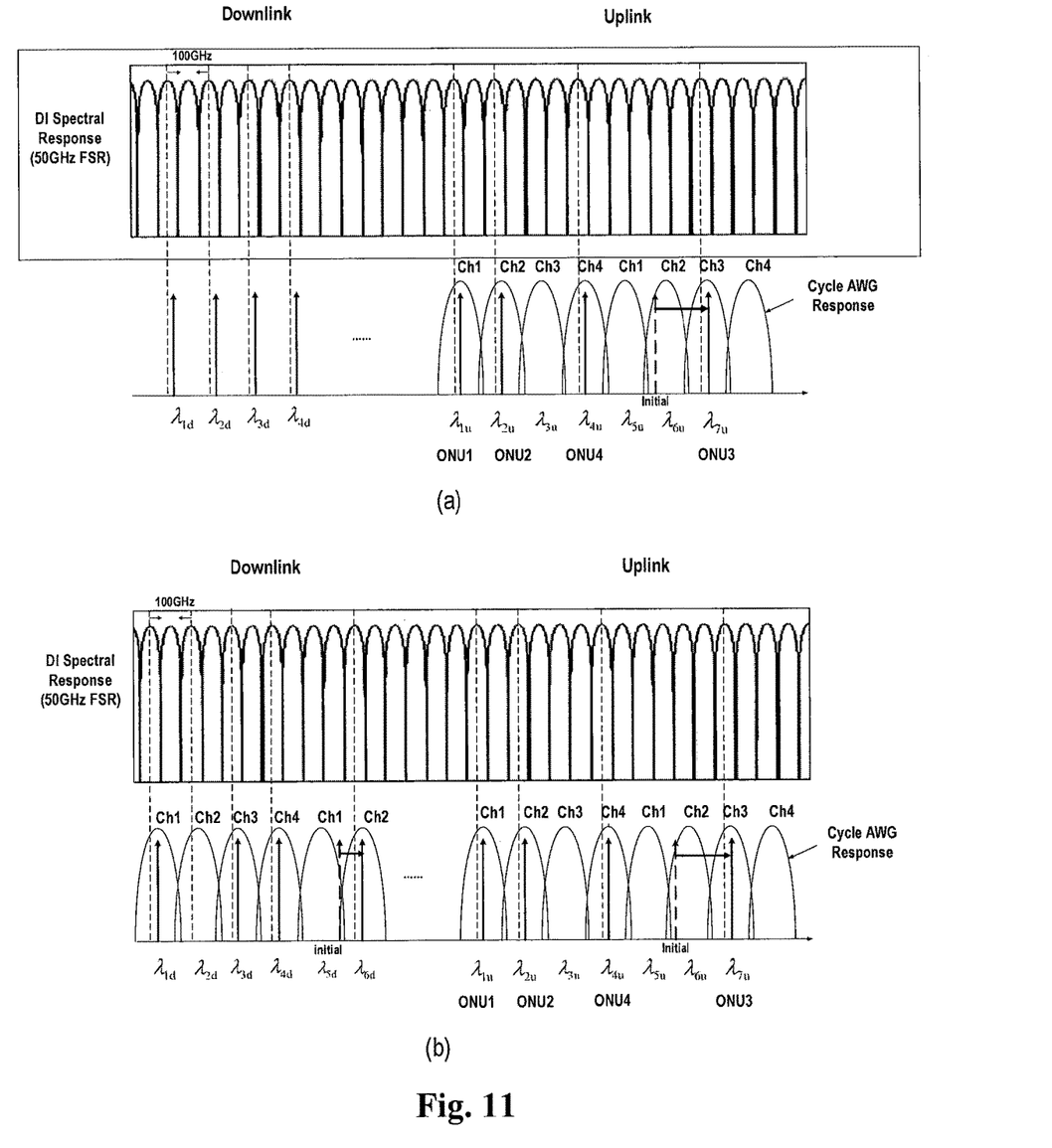

FIG. 11 illustrates a schematic diagram 1100 of spectral distributions of downlink and uplink wavelengths, a cyclic AWG response, and a MZI in accordance with embodiments of the present disclosure. In the diagram 1100, (a) is the case for a DML with a fixed wavelength and (b) is the case for a DML with a tunable wavelength. Under the circumstances of (a) and (b), the wavelengths of the downlink and the uplink signals are no longer accurately aligned with a peak frequency of each passband of an interferometer and instead have frequency red shifts relative to these wavelength channels. In one embodiment, the frequency red shift can be selected to be one third of the spectral range of the interferometer, so as to effectively execute multi-channel duplexing optical equalization.

As mentioned above, the multiplexing/de-multiplexing also can be implemented by introducing the cyclic AWG at the OLT side, such that the wavelength tuning range of the DML is greatly relaxed to 3 nm. Distinguished from the MZI, the downlink and the uplink wavelengths should be aligned with the transmission peak of the AWG channel. According to FIG. 11 (a), in the case of the DML with a fixed wavelength, the downlink wavelength of 4 transmitters is appropriately manufactured to have a frequency shift relative to the peak frequency of the corresponding passband. In this case, the cyclic AWG may not be applied for the downlink. For the uplink signals, since the tunable DML is adopted for each ONU, the cyclic AWG can be applied to relax the wavelength tuning range.

As an example, in order to adjust the wavelength of the ONU3 which has an initial wavelength between $\lambda_{5u}$ and $\lambda_{6u}$, into a target channel 3 (Ch3), the wavelength of the laser is unnecessary to be adjusted into $\lambda_{3u}$ via a wide-range wavelength tuning. Instead, the wavelength of the laser can be directly tuned into $\lambda_{7u}$ with a small amount of wavelength changes through heating, so as to finally output from the port 3 of the cyclic AWG to execute multiplexing. Similarly, the cyclic AWG multiplexing also can be applied into the downlink and the uplink signals for the FIG. 11 (b) in which the transmitters with tunable wavelength are provided at the OLT and the ONU. As shown in FIG. 4 (b), if the initial wavelength of the channel 2 (Ch2) is positioned between $\lambda_{5d}$ and $\lambda_{6d}$, the wavelength is tuned to A6d instead of $\lambda_{2d}$, and thus the wavelength tuning range also can be relaxed.

Figure 12:
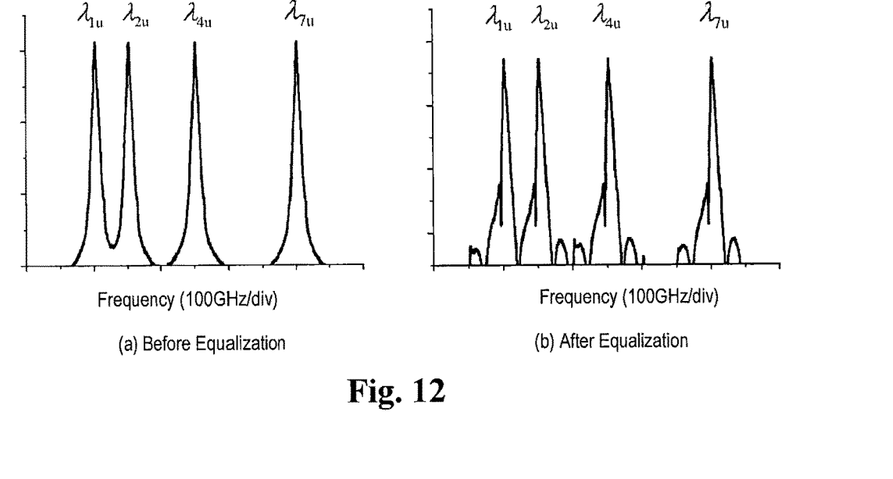

FIG. 12 illustrates a schematic diagram 1200 of spectrums of a wavelength channel before and after MZI in accordance with embodiments of the present disclosure. In this example, four wavelength channels, which respectively are 193.387 THz ($\lambda_{1u}$), 193.487 THz ($\lambda_{2u}$), 193.687 THz ($\lambda_{4u}$) and 193.987 THz ($\lambda_{7u}$), are utilized as shown in FIG. 12 (a). The four wavelengths are generated by the 2.5 GHz DML and modulated with 25 Gb/s duobinary data. Assuming the threshold current of the laser is 21 mA, the bias current can be set to 80 mA and the modulated current can be set to 25 mA. In this case, no optical amplifiers are required for compensating loss. After the transmission of 20 km single-mode fiber, the optical equalization is firstly performed using the MZI with a free spectral range (FSR) of 50 GHz. The peak wavelength of each passband of the interferometer has blue shifts of 17 GHz relative to the four channels. All four channels are simultaneously reshaped after the equalization as shown in FIG. 12 (b). It can be seen that the spectrum of each channel is slightly removed due to the optical equalization. Because of the reshape of the spectrum, the distorted uplink 25 Gb/s duobinary signal is regenerated.

Figure 13:
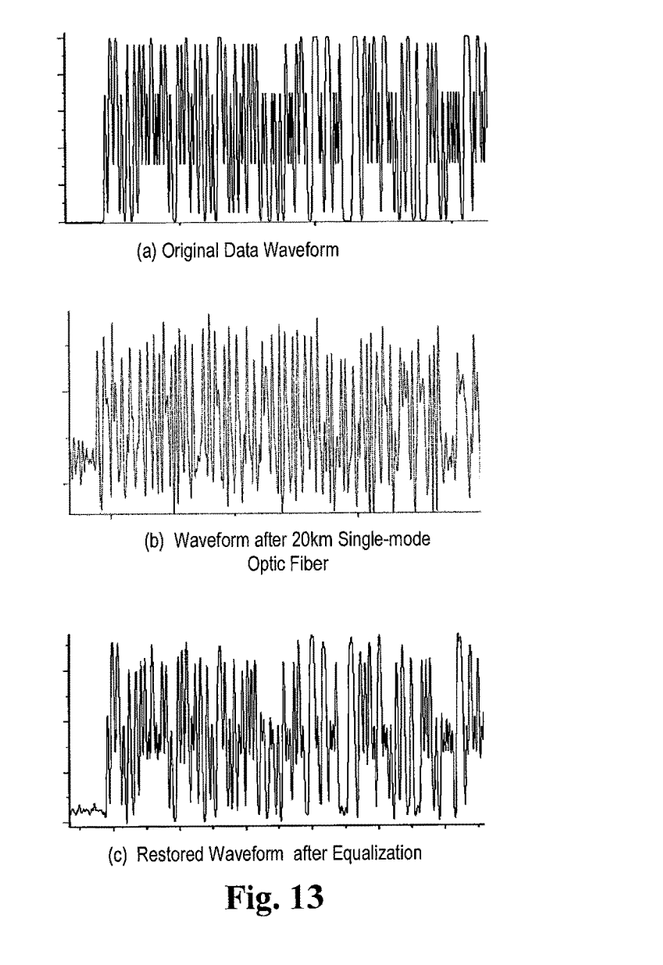

FIG. 13 illustrates a schematic diagram 1300 of the waveform of a data signal of a particular wavelength channel $\lambda_{4u}$ in accordance with embodiments of the present disclosure, wherein FIG. 13 (a) illustrates an original waveform of duobinary data; FIG. 13 (b) shows the waveform after the transmission of the 20 km single-mode fiber and FIG. 13 (c) demonstrates the restored waveform after optical equalization. Accordingly, the duobinary data signals, which have been seriously distorted after the transmission of the 20 km single-mode fiber, are successfully restored via the optical equalization.

Figure 14:
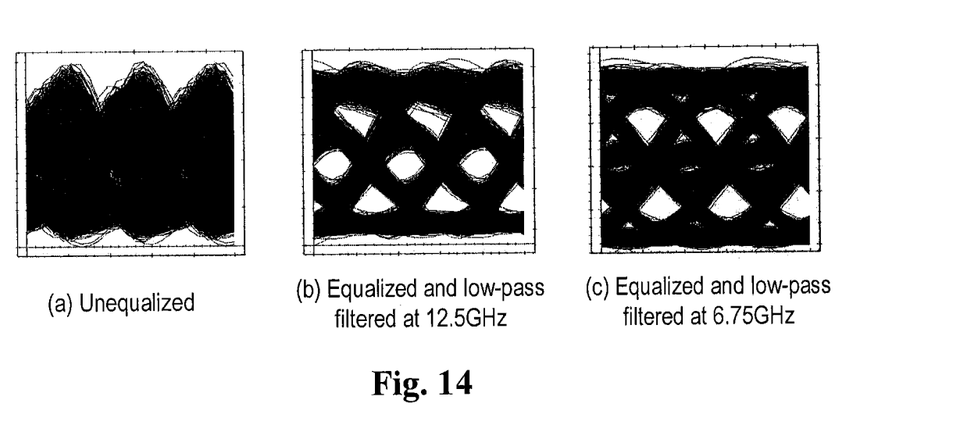

FIG. 14 illustrates a schematic diagram 1400 of a corresponding eye pattern of data signals of particular wavelength channel $\lambda_{4u}$ in accordance with embodiments of the present disclosure. FIGS. 14 (a) shows an eye pattern of the signals restored without the use of MZI-based optical equalizer, wherein the eye pattern is completely closed and no duobinary data are detected. FIG. 14 (b) demonstrates an eye pattern of the signals equalized by the optical equalizer and filtered via the 12.5 GHz low-pass filter, wherein the eye pattern of the restored signals is opened except that the upper portion is not fully opened. FIG. 14 (c) illustrates an eye pattern of the signals equalized by the optical equalizer and filtered via the 6.75 GHz low-pass filter, wherein the eye pattern of the restored signals is fully opened. Accordingly, the low-pass filtering operations are implemented by designing the photoelectric detector and the TIA response to exhibit the cut-off frequency being 0.25-0.3 times the bit rate, so as to ensure the performance of the restored signals.

By far, the present invention has been described in details with reference to various embodiments. Generally speaking, various example embodiments of the present disclosure can be implemented in hardware, dedicated circuits, software, logic or any combinations thereof. Some aspect can be implemented in hardware while other aspects can be implemented in firmware or software executed by controllers, microprocessors or other computing devices. When each aspect of embodiments of the present disclosure is illustrated or described as block diagram and flowchart or represented by some other graphics, it should be understood that the block, apparatus, system, technology or method described here can be implemented in hardware, software, firmware, dedicate circuits, logic, general-purpose hardware, controller, or other computing devices, or any other combinations thereof as non-restrictive examples.

As an example, embodiments of the present disclosure can be described in the context of machine-executable instructions, which is comprised in program modules executed in devices on a target physical or virtual processor for example. In general, program modules comprise routines, programs, libraries, objects, classes, components, data architecture etc. and execute particular tasks or implement particular abstract data structure. In each embodiment, functions of the program module can be merged or divided between the described program modules and the machine-executable instructions for program modules can be executed in local or distributed devices. In the distributed devices, program modules can be positioned in local and remote storage media.

The computer program codes for implementing method of the present disclosure can be written in one of more kinds of programming languages. The computer program codes can be provided to processors of the general-purpose computer, dedicated computer or other programmable data processing apparatuses, such that the program codes, when executed by the computer or other programmable data processing apparatuses, cause the implementation of functions/operations specified in the flowchart and/or block diagram. The program codes can be executed entirely on the computer, partially on the computer, as an independent software package, partially on the computer and partially on the remote computer or entirely on the remote computer or server.

In the context of the present disclosure, machine-readable medium can be any tangible medium that comprises or stores programs for or related to an instruction executing system, apparatus or device. The machine-readable medium can be machine-readable signal medium or machine-readable storage medium and can comprise but not limited to electronic, magnetic, optical, electromagnetic, infrared semiconductor system, apparatus or device, or any suitable combinations thereof. The more specific examples of the machine-readable storage medium comprise an electrical connection including one or more wires, a portable computer disk, a hard disk, a random-access memory (RAM), a read-only memory (ROM), an erasable programmable read-only memory (EPROM or flash), an optical storage device, a magnetic storage device, or any suitable combinations thereof.

Furthermore, although the operations are depicted in a particular order, it should be appreciated that the operations are not required to be completed in the particular order or in succession, or not all operations shown in the drawings need to be executed to obtain the expected result. In some cases, multitasking or multiprocessing is also beneficial. Likewise, although the above discussion comprises some particular implementation details, they should not be interpreted as limiting the scope of the invention or claims. On the contrary, they should be appreciated as description for particular embodiments of the particular invention. Some features described separately in the context of the embodiments of the description can also be integrated and implemented in a single embodiment. Conversely, all kinds of features described in the context of a single embodiment can also be separately implemented in multiple embodiments or any suitable sub-combinations.

Although the subject matter has been described in languages specific to structural features and/or method actions, it should be understood that the subject matter defined in the attached claims is not limited to the above described particular features or actions. On the contrary, the above described specific features and actions are disclosed for implementing examples of the claims.

I claim:

1. A method of transmitting data, comprising:
    encoding, at an optical line terminal, data to be transmitted over a plurality of wavelength channels;
    providing the encoded data to corresponding tunable wavelength lasers with heaters as modulation inputs, to enable the lasers to generate optical signals representing the data;
    tuning, through heat, the optical signals to target channels;

multiplexing the optical signals; and equalizing, with an optical equalizer based a Mach-Zehnder interferometer, the multiplexed optical signals for transmission via an optical transmission link, wherein a free spectral range of the Mach-Zehnder interferometer is half an interval between wavelength channels, and wherein a frequency red shift of the optical signals is selected as one third of the free spectral range.

2. The method of claim 1, wherein encoding the data comprises:

performing a duobinary encoding on the data by low-pass filtering of the data.

3. The method of claim 1, wherein the lasers are narrow-band lasers.

4. The method of claim 3, wherein bias currents of the lasers are selected as 3 to 5 times threshold currents of the lasers and modulated currents of the lasers are selected as higher than the threshold currents.

5. The method of claim 1, wherein multiplexing the optical signals comprises:

multiplexing the optical signals with cyclic arrayed waveguide grating; and performing wavelength division multiplexing on the optical signals multiplexed with the cyclic arrayed waveguide grating.

6. The method of claim 5, wherein performing the wavelength division multiplexing on the optical signals multiplexed with cyclic arrayed waveguide grating comprises:

amplifying the optical signals multiplexed with the cyclic arrayed waveguide grating; and performing the wavelength division multiplexing on the amplified optical signals.

7. A method of receiving data, comprising:

equalizing optical signals received from an optical transmission link, the optical signals including multiplexed optical signals equalized by a Mach-Zehnder interferometer, wherein a free spectral range of the Mach-Zehnder interferometer is half an interval between wavelength channels and a frequency red shift of the optical signals is one third of the free spectral range;

de-multiplexing, at an optical network unit, the equalized optical signals via a demultiplexer;

selecting, from the de-multiplexed optical signals, an optical signal via a tunable filter, the optical signal corresponding to a particular wavelength channel;

converting the selected optical signal into an electric signal; and decoding the electric signal to determine the data.

8. The method of claim 7, wherein decoding the electric signal comprises:

filtering the electric signals by low-pass filtering; and decoding the electric signals filtered by the low-pass filtering.

9. A device implemented at an optical line terminal for transmitting data, comprising:

an encoder configured to encode data to be transmitted over a plurality of wavelength channels;

a plurality of tunable wavelength lasers with heaters, the heaters configured to tune optical signals to target channels;

a signal generator configured to provide the encoded data to corresponding lasers of the plurality of lasers as modulation inputs, to enable the corresponding lasers to generate optical signals representing the data;

a multiplexer configured to multiplex the optical signals; and an optical equalizer based on a Mach-Zehnder Interferometer configured to equalize the multiplexed optical signals for transmission via an optical transmission link, wherein a free spectral range of the Mach-Zehnder interferometer is half an interval between wavelength channels, and wherein a frequency red shift of the optical signals is selected as one third of the free spectral range.

10. The device of claim 9, wherein the encoder is configured to perform a duobinary encoding on the data by low-pass filtering of the data.

11. The device of claim 9, wherein the lasers are narrow-band lasers.

12. The device of claim 11, wherein bias currents of the lasers are selected as 3 to 5 times threshold currents of the lasers and modulated currents of the lasers are selected as higher than the threshold currents.

13. The device of claim 9, wherein the multiplexer comprises:

a first multiplexer configured to multiplex the optical signals with cyclic arrayed waveguide grating; and a second multiplexer configured to perform wavelength division multiplexing on the optical signals multiplexed with the cyclic arrayed waveguide grating.

14. The device of claim 13, further comprising: an amplifier configured to amplify the optical signals multiplexed with the cyclic arrayed waveguide grating; and wherein the second multiplexer is configured to perform the wavelength division multiplexing on the amplified optical signals.

15. A device implemented at an optical network unit for receiving data, comprising:

an equalizer configured to equalize optical signals received from an optical transmission link, the optical signals including multiplexed optical signals equalized by a Mach-Zehnder interferometer, wherein a free spectral range of the Mach-Zehnder interferometer is half an interval between wavelength channels and a frequency red shift of the optical signals is one third of the free spectral range;

a de-multiplexer configured to de-multiplex optical signals received from an optical transmission link;

a tunable filter configured to select, from the de-multiplexed optical signals, an optical signal corresponding to a particular wavelength channel;

a photoelectric converter configured to convert the selected optical signal into an electric signal;

a filter configured to filter the electric signal by low-pass filtering, a cut-off frequency of the filter being 0.25-0.3 times a bit rate of the optical signals; and a decoder configured to decode the electric signal to determine the data.

16. The device of claim 15, wherein the decoder is configured to decode the electric signal filtered by the filtering, to determine the data.

* * * * *